United States Patent [19]
Kim

[11] Patent Number: 5,902,979
[45] Date of Patent: May 11, 1999

[54] GAS INSULATION TYPE LOAD BREAK SYSTEM

[75] Inventor: Young Geun Kim, Cheongju, Rep. of Korea

[73] Assignee: LG Industrial Systems Co., Ltd., Seoul, Rep. of Korea

[21] Appl. No.: 08/820,991

[22] Filed: Jan. 15, 1997

[51] Int. Cl.[6] .......................... H01H 33/88; H01H 33/18; H01H 33/04
[52] U.S. Cl. .................................. 218/67; 218/55; 218/84
[58] Field of Search ................................. 218/12, 14, 30, 218/55, 67, 68, 79, 80, 84, 86; 361/612, 618

[56] References Cited

U.S. PATENT DOCUMENTS

| | | | |
|---|---|---|---|
| 3,603,752 | 9/1971 | Frink | 200/148 R |
| 3,646,284 | 2/1972 | Bokshorn et al. | 200/48 R |
| 3,727,109 | 4/1973 | Kozlovic | 317/103 |
| 4,300,028 | 11/1981 | Cronin et al. | 200/155 R |
| 4,389,553 | 6/1983 | Konig et al. | 200/147 H |
| 4,523,253 | 6/1985 | Grunberg et al. | 361/335 |
| 5,003,427 | 3/1991 | Reichl et al. | 361/341 |

*Primary Examiner*—Wynn Wood Coggins
*Assistant Examiner*—Michael J. Hayes
*Attorney, Agent, or Firm*—Oliff & Berridge, PLC

[57] ABSTRACT

An improved gas insulation type load break system, which is capable of more easily discharging remaining current of a cable to which the power supply is disconnected, and enabling an easier cable connection test after the cable connection work is finished, which includes a switch main body, the switch main body being made of a single container; an operation handles mounted on a front panel of the switch main body for controlling opening/closing state and earthing state of a current applied thereto; a main circuit bushing mounted on a front panel of the switch main body for forming an opening/closing path of a current; an earthing bushing mounted at one side of the main circuit bushing for forming an earthing path; a current supply fixed contact point connected to the main circuit bushing, through which a current is applied to the interior of the switch main body; an earthing fixed contact point connected to the earthing bushing for discharging a current applied to the interior of the switch main body; a main shaft rotatable in cooperation with the operation handles; a movable arm engaged to the main shaft and movably communicating with the rotation of the main shaft; and a current transfer member operably mounted at the movable arm and selectively connected between the current supply fixed contact point and the earthing fixed contact point in cooperation with the rotation of the movable arm.

19 Claims, 14 Drawing Sheets

CONVENTIONAL ART   CONVENTIONAL ART

GAS INSULATION TYPE LOAD BREAK SYSTEM

BACKGROUND OF THE INVENTION

1. Field of the Invention

The present invention relates to a gas insulation type load break system, and particularly to an improved gas insulation type load break system, which is capable of more easily discharging remaining current of a cable to which the power supply is disconnected, and enabling an easier cable connection test after the cable connection work is finished.

2. Description of the Prior Art

Conventionally, when power supply is disconnected at a predetermined section of a power cable connection, a load break system is used to repair the power supply failure. When repairing the power supply failure, an earthing operation should be manually performed before the repair of the disconnection so as to discharge a remaining current at the disconnected section.

In addition, after completing cable connection work, it is difficult to test whether or not there is any cable connection problem in the cable connection work. That is, when checking the cable connection work, earthing operation should be performed manually. The above-mentioned two manual operation may cause safety accident, so that in the industry the need for more easily discharging the remaining current and for more easily testing the cable connection work is required.

In more detail, in the industry, the gas insulation load break system has been used, which is directed to only two-position method. That is, the above-mentioned two-position method is limited to its range of usage: open and close states. Since this conventional method is directed to generating arc in the air when discharging the remaining current, it may cause safety accident.

The above-mentioned problems will now be explained in more detail with reference to the construction and operation of the conventional gas insulation type load break system.

To begin with, as shown in FIGS. 1 and 2A through 2F, when the switches S1 and S2 are opened, respectively, so as to test cable connection work or so as to maintain the cable connection, it is disadvantageously necessary to test the cable connection in an interlocked state. In addition, the arc discharging with respect to the earthing and charged current should be performed. A process for insulating using a bushing, as shown in FIG. 2F, is necessary by dividing the cable as shown in FIG. 2D and by earthing the divided cable as shown in FIG. 2E.

As described above, before the earthing work is finished, it is considered that the cable is electrically alive. That is, the cable connection is considered in a charged state. So, a very careful maintenance work is necessary. In other words, a safety accident may occur.

The construction and operation of the conventional gas insulation type load break system will now be explained in more detail with reference to FIG. 3A through FIG. 7B.

As shown therein, in the conventional gas insulation type load break system, when the switch becomes operational in accordance with an operation of an operation handle 4 disposed at a front panel of a switch main body 1, a movable contact point 7 comes into contact with a fixed contact point 6 connected to a main circuit bushing 5 or is escaped therefrom. In addition, current is applied to the switch main body 1 through the main circuit bushing 5, or the current supply is disconnected therefrom.

FIG. 5A shows a conventional puffer in which a cable is disconnected so as to show the operation of the same, and FIG. 5B shows a conventional puffer in which a cable is connected so as to show the operation of the same. In addition, FIG. 6A shows an engaged state of a connector kit of a conventional load break system, and FIG. 6B shows a disassembled state of a connector kit of a conventional load break system, and FIG. 7A shows a connector kit of a conventional load break system in which an insulation cap is removed so as to show a discharging operation of the same, and FIG. 7B shows a connector kit of a conventional load break system in which an earthing elbow is inserted so as to show a discharging operation of the same.

As shown therein, when the switch is disconnected for the maintenance or another cable connection work, the insulation cap 12 is removed using an insulation stick 13 for preventing safety accident of the operator, and then an earthing elbow 14 is instantly inserted and removed, so that the charged current of the cable is discharged, generating arc in the air.

In FIGS. 6A through 7B, reference numeral 8 denotes an elbow connector, 9 denotes a connection terminal, 10 denotes a cable adapter, and 11 denotes a connection plug.

As described above, since the conventional gas insulation type load break system is directed to a two-position operation switch, there may occur safety accident when discharging the cable after a cable connection work or testing the cable connection after a cable connection work by using a connection member 2 at the end portion of the cable 3 when earthing the cable 3.

In addition, so as to prevent the above-mentioned accident, an additional work of using an insulation stick is necessary when discharging the remaining current of the cable.

SUMMARY OF THE INVENTION

Accordingly, it is an object of the present invention to provide a gas insulation type load break system, which overcomes the problems encountered in a conventional insulation type load break system.

It is another object of the present invention to provide a gas insulation type load break system, which is capable of more easily discharging remaining current of a cable to which the supply of electric power is cut off.

It is still another object of the present invention to provide a gas insulation type load break system, which is capable of enabling easier cable connection test after cable connection work is finished.

It is still another object of the present invention to provide a gas insulation type load break system, which is capable of combining an SF6 insulation with a puffer technology to provide a switch with a puffer power without the need of a desired externally stored gas source of SF6.

It is still another object of the present invention to provide a gas insulation type load break system, by which arching in SF6 does not create conductive deposits or create explosive gas.

It is still another object of the present invention to provide a gas insulation type load break system, which is capable of reducing weight of the same.

It is still another object of the present invention to provide a gas insulation type load break system, by which the switch can be mounted at a predetermined position requiring fewer mounting requirements.

It is still another object of the present invention to provide a gas insulation type load break system, by which no need for fire-proof construction or precautions for drainge and ventilation.

To achieve the above objects, there is provided a gas insulation type load break system of the present invention, which includes a switch main body, the switch main body being made of a single container in which preferably filled with $SF_6$ gas which has non-flammable characteristic; an operation handle mounted on a front panel of the switch main body for controlling opening/closing state and earthing state of a current applied thereto; a main circuit bushing mounted on a front panel of the switch main body for forming an opening/closing path of a current; an earthing bushing mounted at one side of the main circuit bushing for forming an earthing path; a current supply fixed contact point connected to the main circuit bushing, through which a current is applied to the interior of the switch main body; an earthing fixed contact point connected to the earthing bushing for discharging a current applied to the interior of the switch main body; a main shaft rotatable in cooperation with the operation handle; a movable arm engaged to the main shaft and movably communicating with the rotation of the main shaft; and a current transfer member operably mounted at the movable arm and selectively connected to either the current supply fixed contact point and the earthing fixed contact point in in response to rotation of the movable arm, thus selectively connecting to, disconnecting and earthing a current.

One aspect of the invention also provides a switching device that selectively connects an electrical line to a current supply terminal or a ground terminal, and selectively disconnects the electrical line from the current supply terminal and the grounding terminal. The electrical line can be simultaneously disconnected from the current supply terminal and the grounding terminal.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention is directed to performing a discharging work of the remaining current of the cable and testing the cable connection within a sealed single container in which a $SF_6$ gas having a non-flammable characteristic is preferably filled.

Figure 8:
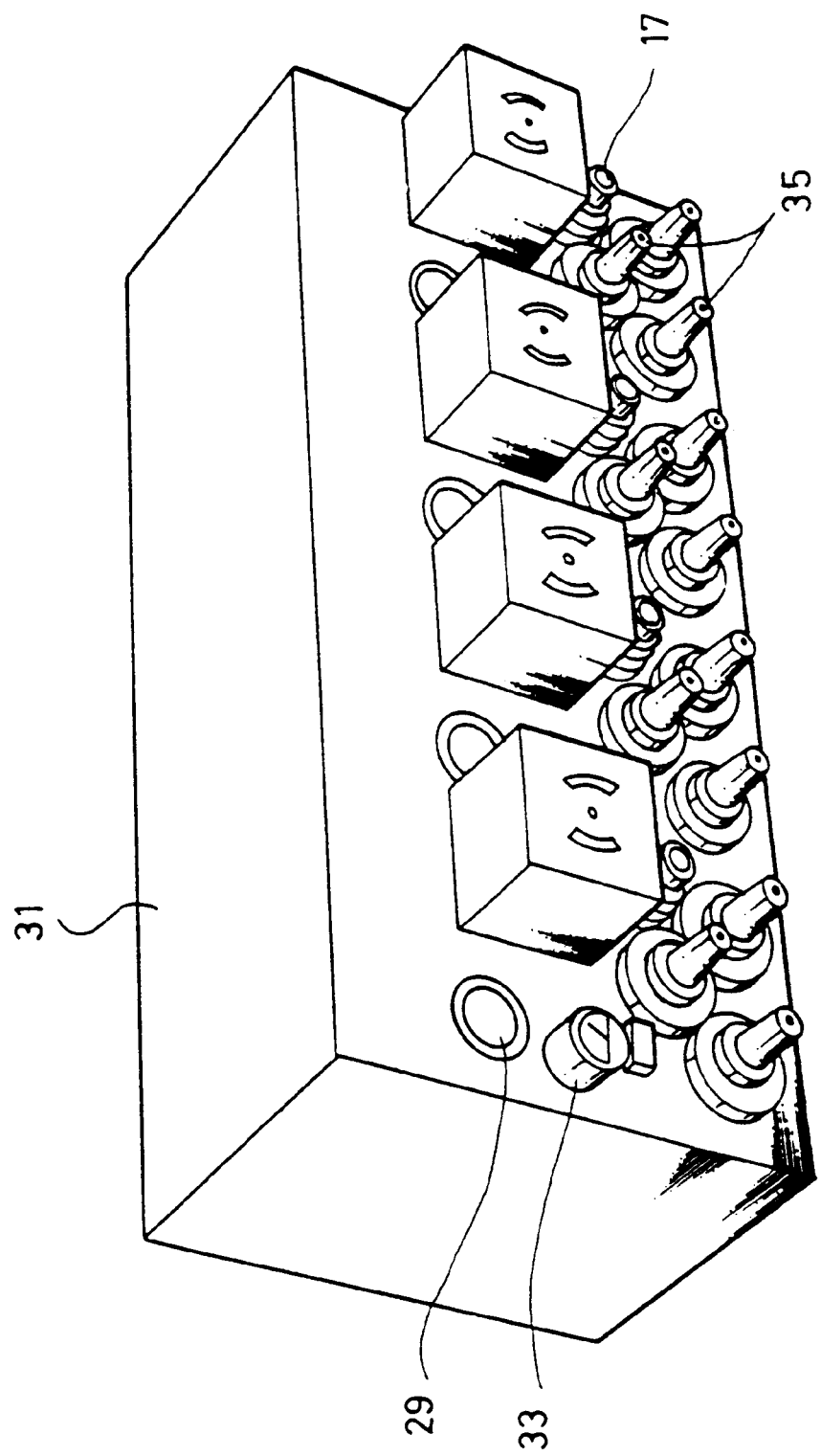
FIG. 8 is a perspective diagram of a gas insulation type load break system of the present invention.

FIG. 8 shows the gas insulation type load break system, which includes a plurality of operation handles 15 disposed at a front panel of a switch main body 31 which is referred to as a sealed single container, and a plurality of main circuit bushings 35 in which a cable is connected. An earthing bushing 17 is provided at one side of each of the main circuit bushings 35. In addition, a checking window 29 is disposed at the upper portion of the main circuit bushings 35 so as to control the operation handles 15 watching the operation handles 15 therethrough. In the drawings, reference numeral 32 denotes a fill valve, and 33 denotes a pressure gauge.

Figure 9:
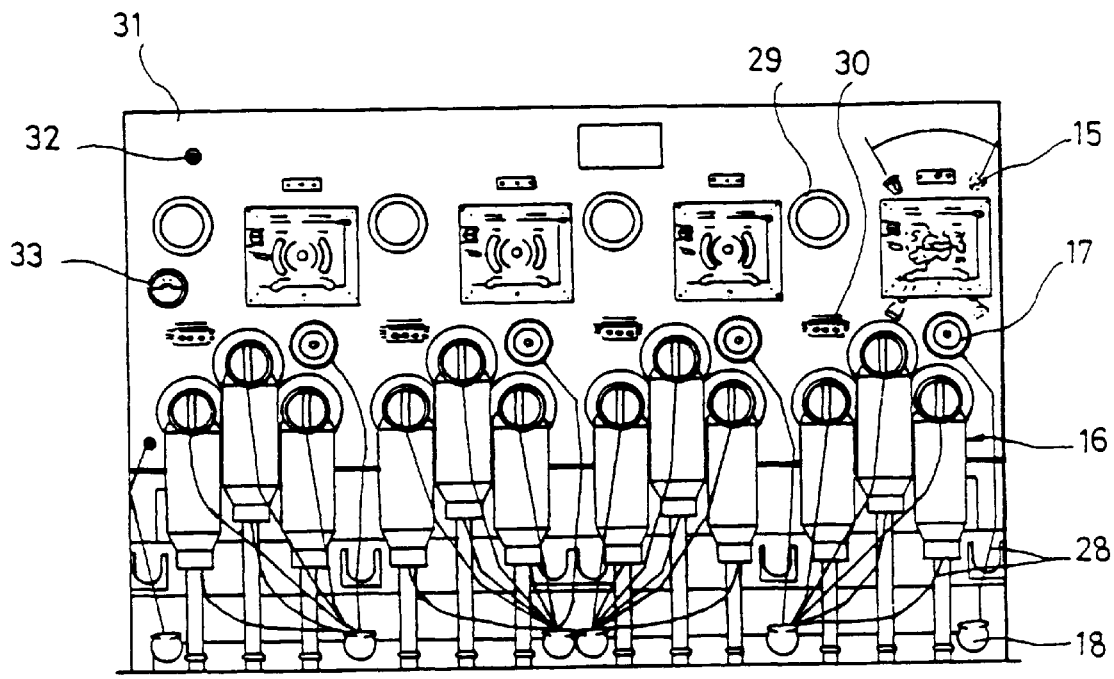
FIG. 9 is a front diagram of a gas insulation type load break system of the present invention.
Figure 10:
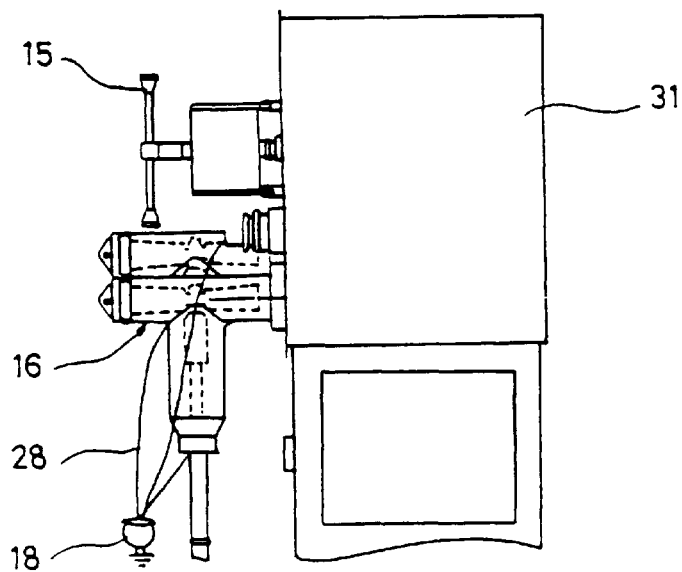
FIG. 10 is a side diagram of a gas insulation type load break system of the present invention.

In addition, FIG. 9 shows a gas insulation type load break system of the present invention, and FIG. 10 shows a gas insulation type load break system of the present invention.

In the drawings, reference numeral 16 denotes a connection member terminal kit, 18 denotes a ground lug, 28 denotes a mold cone (or an earthing wire).

Figure 1:
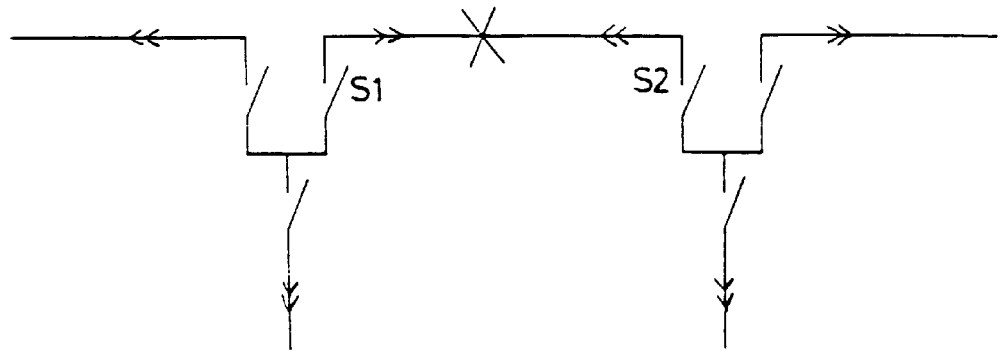
FIG. 1 is a diagram of a cable connection of a conventional load break system at a predetermined position where needs maintenance, cable connection test, or cable connection work.
Figure 2A:
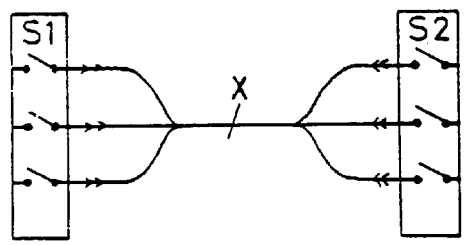
FIG. 2A is a diagram of a conventional load break system which is connected so as to show a cable maintenance and a cable connection test.
Figure 2B:
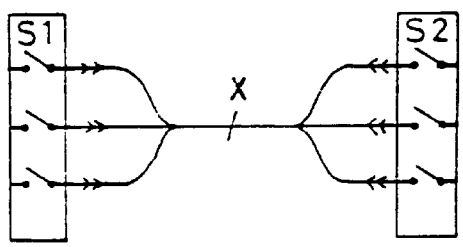
FIG. 2B is a diagram of a conventional load break system for testing whether or not the cable is charged so as to show a cable maintenance and a cable connection test.
Figure 2C:
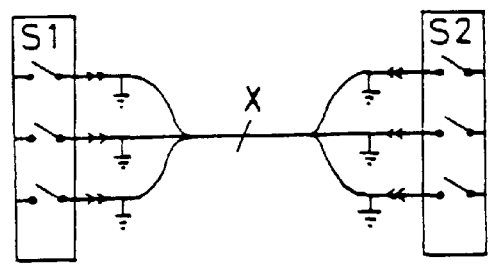
FIG. 2C is a diagram of a conventional load break system in which earthed and charged current are discharged so as to show a cable maintenance and a cable connection test.
Figure 2D:
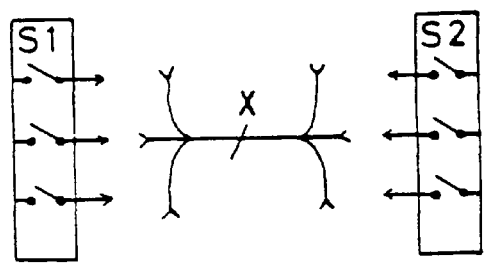
FIG. 2D is a diagram of a conventional load break system in which cable is disconnected so as to show a cable maintenance and a cable connection test.
Figure 2E:
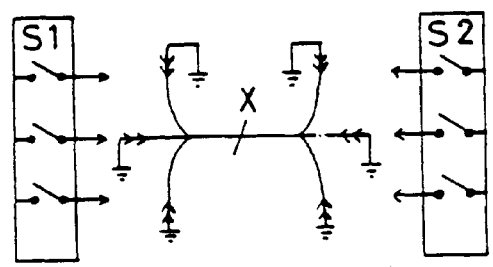
FIG. 2E is a diagram of a conventional load break system in which cable is connected so as to show a cable maintenance and a cable connection test.
Figure 2F:
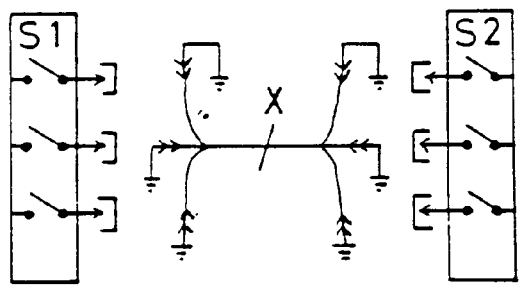
FIG. 2F is diagram of a conventional load break system in which cable is insulated using bushing so as to show a cable maintenance and a cable connection test.
Figure 3A:
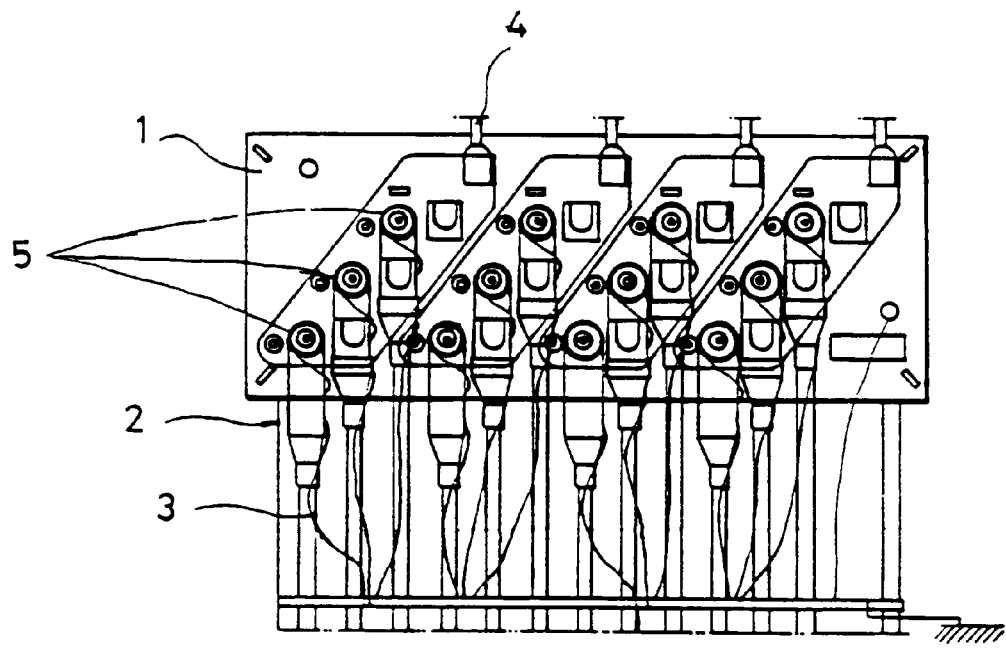
FIG. 3A is a front diagram of a conventional load break system.
Figure 3B:
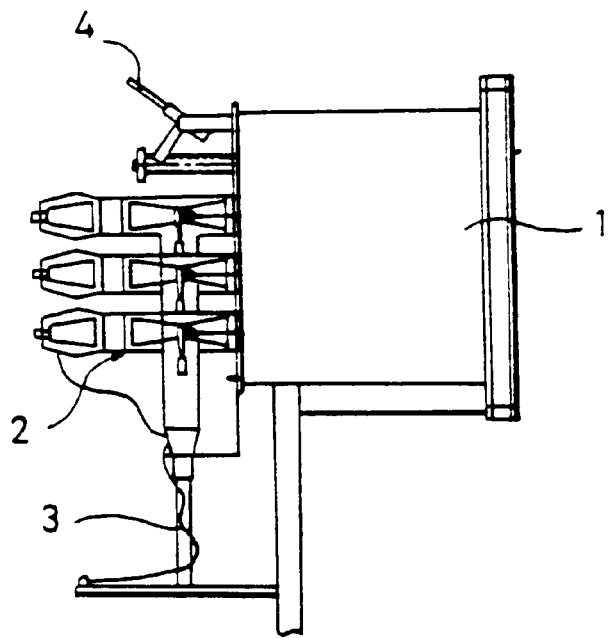
FIG. 3B is a side diagram of a conventional load break system.
Figure 4:
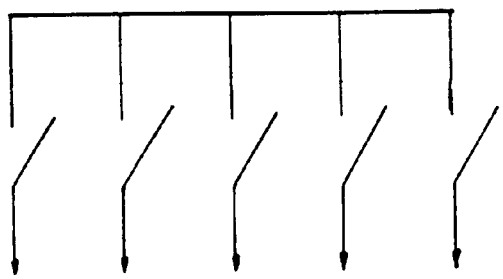
FIG. 4 is a diagram of a cable connection of a conventional load break system.
Figures 5A, 5B:
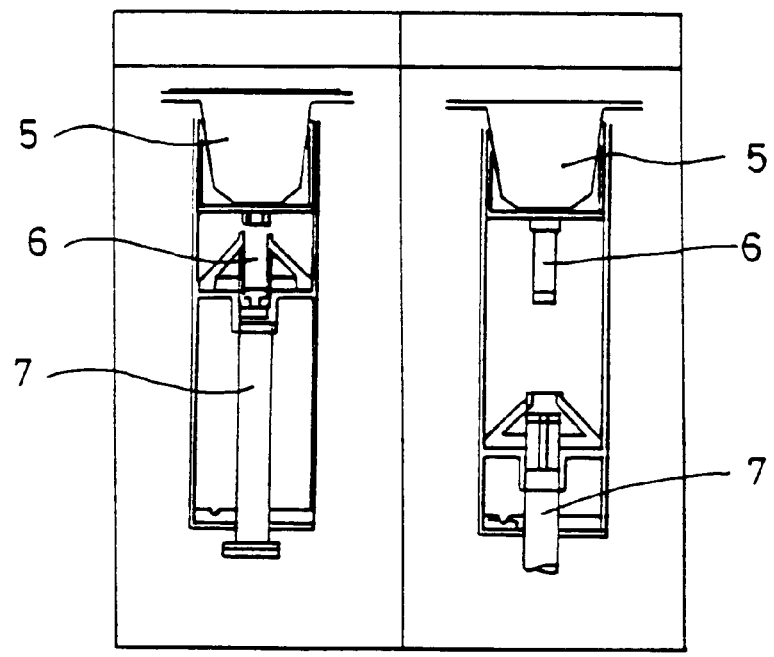
FIG. 5A is a cross-sectional diagram of a conventional puffer in which a cable is disconnected so as to show the operation of the same.
FIG. 5B is a cross-sectional diagram of a conventional puffer in which a cable is connected so as to show the operation of the same.
Figure 11:
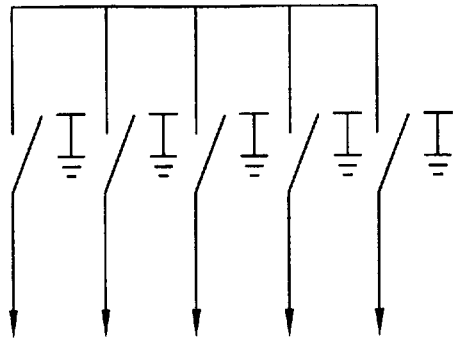
FIG. 11 is a diagram of a gas insulation type load break system of the present invention so as to show a cable connection state.

FIG. 11 shows a gas insulation type load break system of the present invention so as to show a cable connection state. As shown therein, there is shown a three position switch as compared to the conventional two position switch of FIG. 4. That is, the switch is switched between a closed position, an open position, and an earth position.

Figure 12:
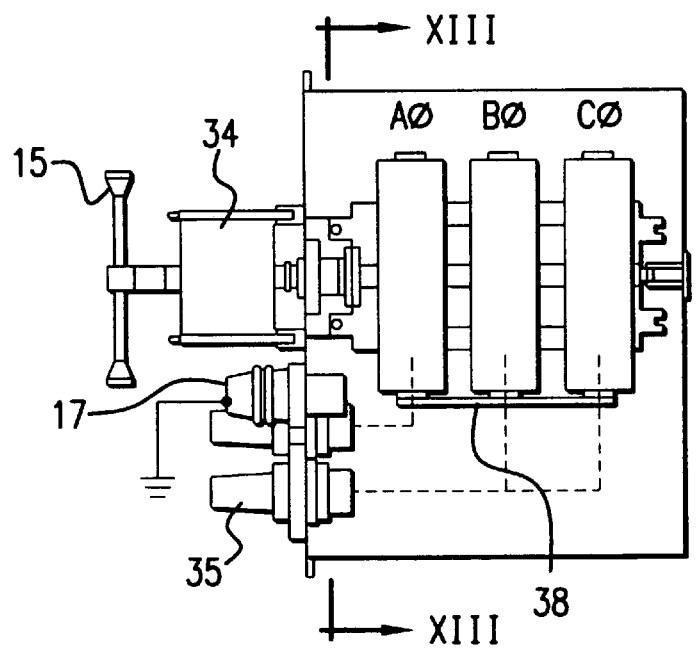
FIG. 12 is a horizontal cross-sectional diagram of a gas insulation type load break system of the present invention.

FIG. 12 shows a gas insulation type load break system of the present invention. As shown therein, the current switching and earthing member 34 connected by the operation handles 15 is connected to the main circuit bushings 35. In the drawing, reference numeral 38 denotes a ground bush bar.

Figure 13:
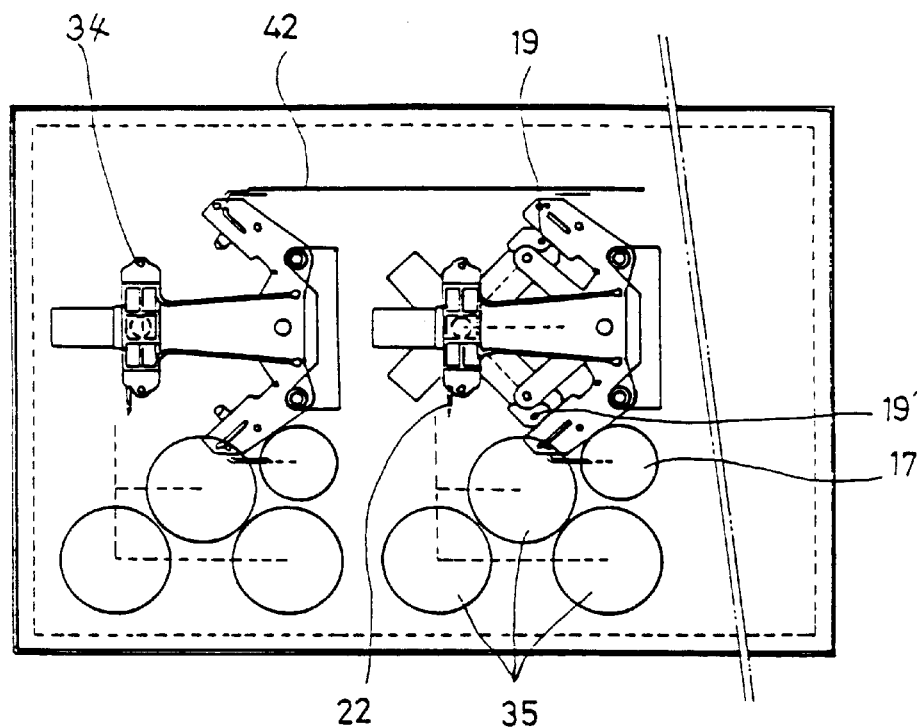
FIG. 13 is a horizontal cross-sectional diagram of a gas insulation type load break system taken along the line A-A' of FIG. 12 of the present invention.

FIG. 13 shows a gas insulation type load break system taken along the line A-A' of FIG. 12 of the present invention. As shown therein, the current switching and earthing member 34 includes a current supplying fixed contact point 19 for supplying a current, an earthing fixed contact point 19' for discharging current, and a current transfer member for closing/opening current between the current supplying fixed contact point 19 and the earthing fixed contact point 19'.

Figure 14:
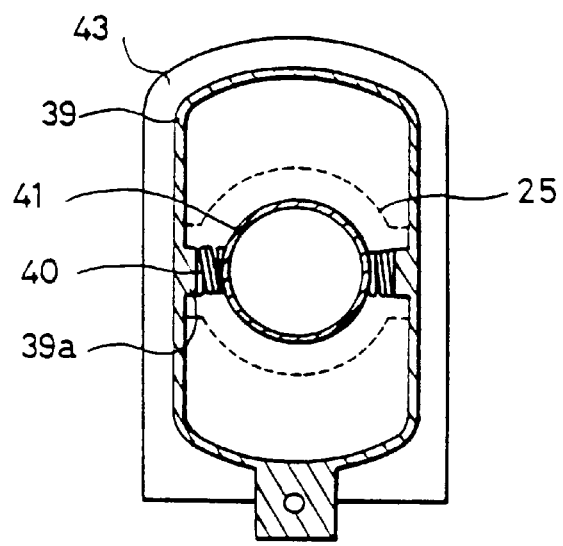
FIG. 14 is a cross-sectional diagram of a current transfer member of a gas insulation type load break system of the present invention.
Figure 15:
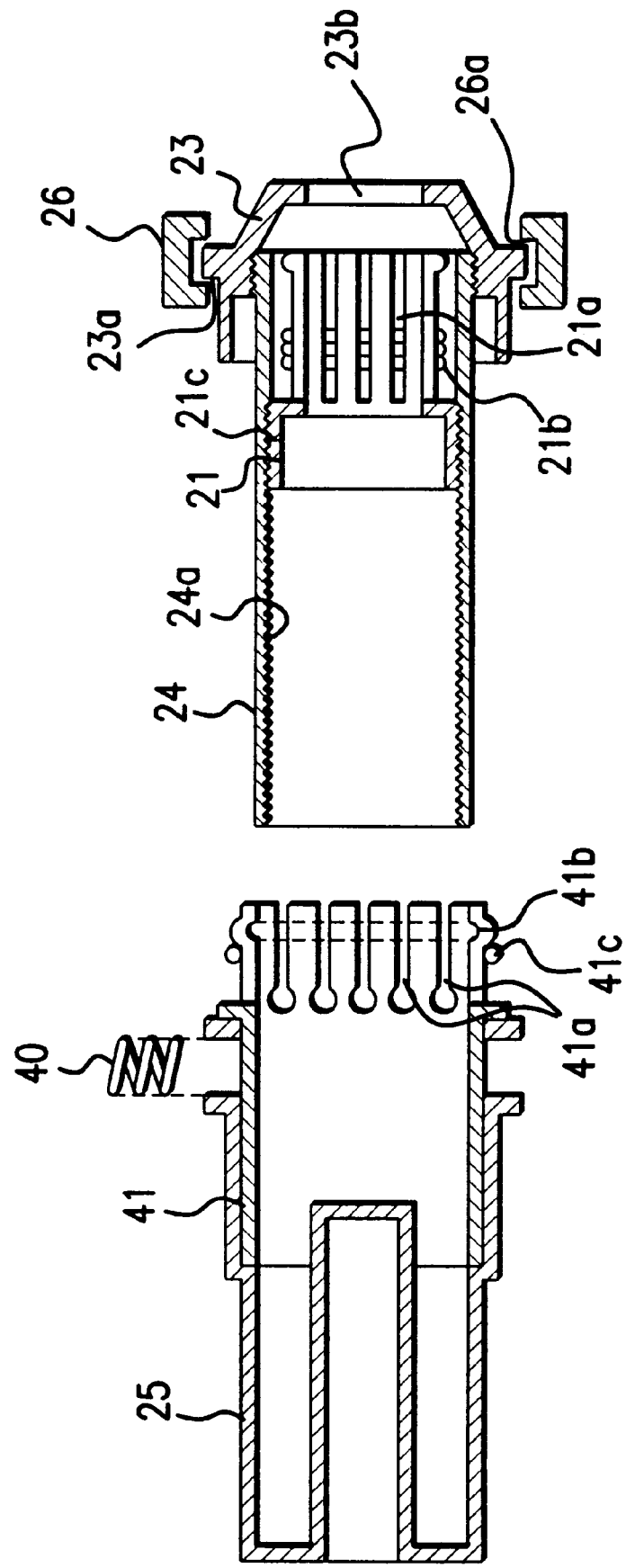
FIG. 15 is a cross-sectional diagram of a dissembled cylinder and piston of a current transfer member of a gas insulation type load break system of the present invention.
Figure 16:
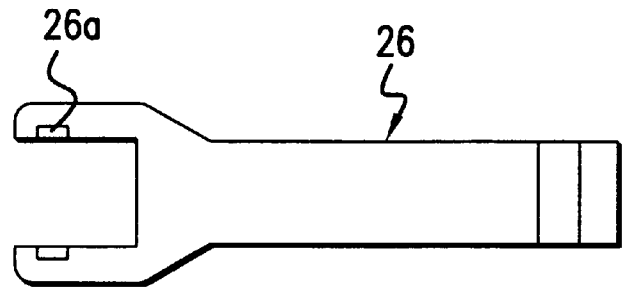
FIG. 16 is a top diagram of a movable arm of a gas insulation type load break system of the present invention.
Figure 17A:
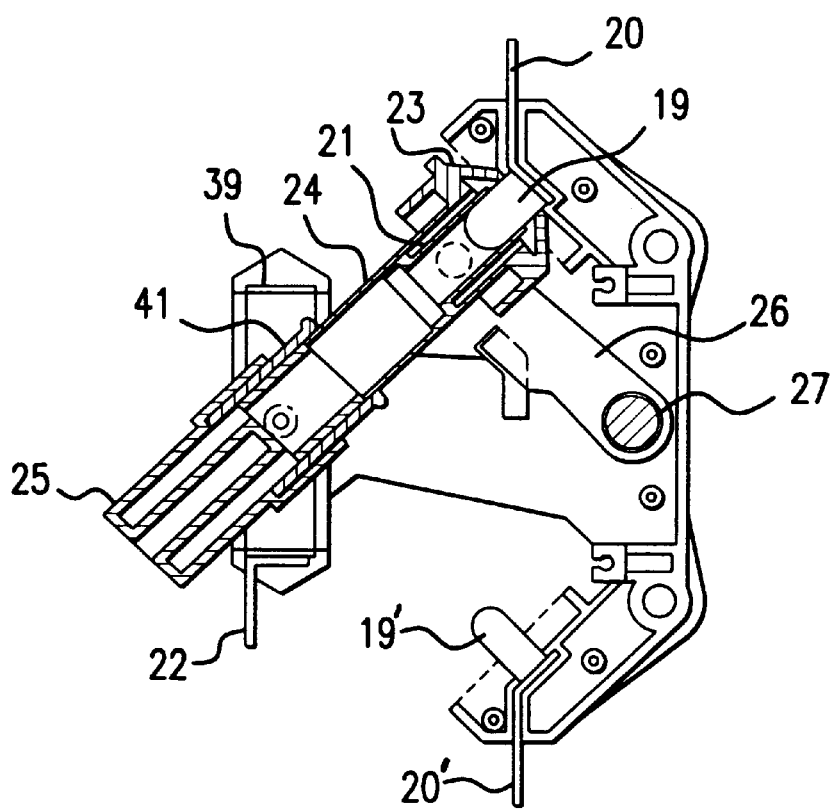
FIG. 17A is a partial cross-sectional diagram of a gas insulation type load break system of the present invention to which power is supplied.
Figure 17B:
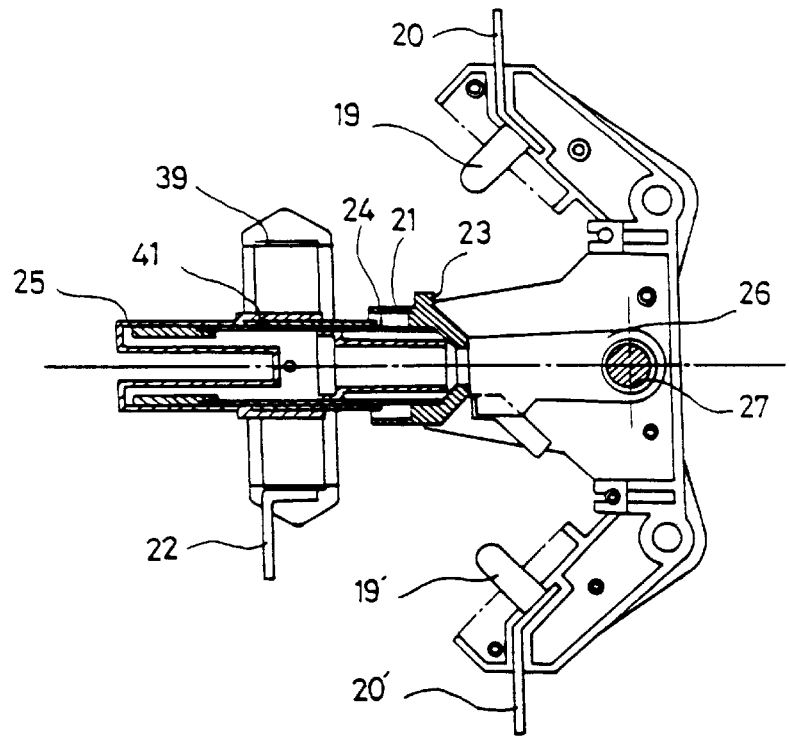
FIG. 17B is a partial cross-sectional diagram of a gas insulation type load break system of the present invention to which power is not supplied.

The above-mentioned current closing/opening and earthing member 34 is shown in FIGS. 14 through 16 in detail, and FIG. 17B shows an enlarged view of the same.

With reference to the above-mentioned figures, the construction of the current closing/opening and earthing member 34 will now be explained in more detail.

The operating handle 15 operably disposed at the front panel of the switch main body 31 is rotatably connected to a main shaft 27 in the interior of the switch main body 31, and a movable arm 26 is engaged to the main shaft 27.

As shown in FIG. 17A, a current supply line 20 and a grounding line 20' are connected to a current supply fixed point 19 and an earthing fixed contact point 19', respectively. A load line 22 is connected to a predetermined shaped conductive member 39.

A cylinder 25 in which a sliding contact point 41 is formed is disposed at the inside portion of the predetermined shaped conductive member 39. A metallic piston 24 is disposed within the cylinder 25 and reciprocatable at the inside portion of the sliding contact point 41. In addition, a movement contact point 21 is formed in the metallic piston 24.

Meanwhile, an insulation cap 23 is engaged to the upper portion of the metallic piston 24. A protrusion 23a is formed at the outer circumferential portion of the insulation cap 23. As shown in FIGS. 15 and 16, a groove portion 26a of the movable arm 26 is engaged to the protrusion 23a of the insulation cap 23, and the movable arm 26 and the insulation cap 23 are engaged to each other.

As shown in FIG. 15, the sliding contact point 41 includes a plurality of slits 41a which come into contact with the metallic piston 24, and a protrusion 41b is formed at the upper portion of the slits 41a, and a spring 41c is engaged at the lower portion of the protrusion 41b.

In addition, a plurality of slits 21a are longitudinally formed at the outer circumferential portion of the movement contact point 21, and a plurality of springs 21b are provided therein.

The inner portion 24a of the metallic piston 24 is tapped, and the movement contact point 21 includes a tapped lower outer circumferential portion 21c, and the movement contact point 21 is engaged to the interior portion of the metallic piston 24.

As shown in FIG. 14, the predetermined shaped conductive member 39 includes a fixed protrusion 39a formed at an inner portion of the same, and a copper spring 40 for connecting the predetermined shaped conductive member 39 and the sliding contact point 41 is provided at the fixed protrusion 39a.

In addition, as shown in FIG. 13, the load line 22 contact point is disposed at one side of the predetermined shaped conductive member 39.

The operation of the gas insulation type load break system of the present invention will now be explained with reference to the accompanying drawings.

To begin with, the gas insulation type load break system is directed to further providing an switching function with an earthing function. Normally, the cable connection maintains a closed state. That is, the current transfer member is connected to the current supplying fixed contact point 19. Here, as shown in FIG. 10, the earthing bushing 17 and the ground lug 18 are earthed by the mold cone or the earthing wire 28 by operating the operational handles 15.

That is, as shown in FIG. 17A, the current supplying fixed contact point 19 is inserted into a hollow 23b of the insulation cap 23 and connected to the movement contact point 21, and the movement contact point 21 is connected to the metallic piston 24, and to the load line 22 by the cylinder 25.

In the above-mentioned state, when rotating the main shaft 27 by operating the operating handles 15 so as to switch between the closed state and the opened state, the movable arm 26 rotates in the counterclockwise direction, and the insulation cap 23 engaged to the movable arm 26 rotates in the clockwise direction, and as shown in FIG. 17B, the cylinder 25 rotates about the copper spring 40, so that the metallic piston 24 and the movement contact point 21 engaged with the insulation cap 23 slides toward the interior of the sliding contact point 41 of the cylinder 25, and thus the current supplying fixed contact point 19 is withdrawn from the insulation cap 23. That is, as described above, the movement contact point 21 is separated from the current supplying fixed contact point 19, so that the current supply is disconnected.

Figure 17C:
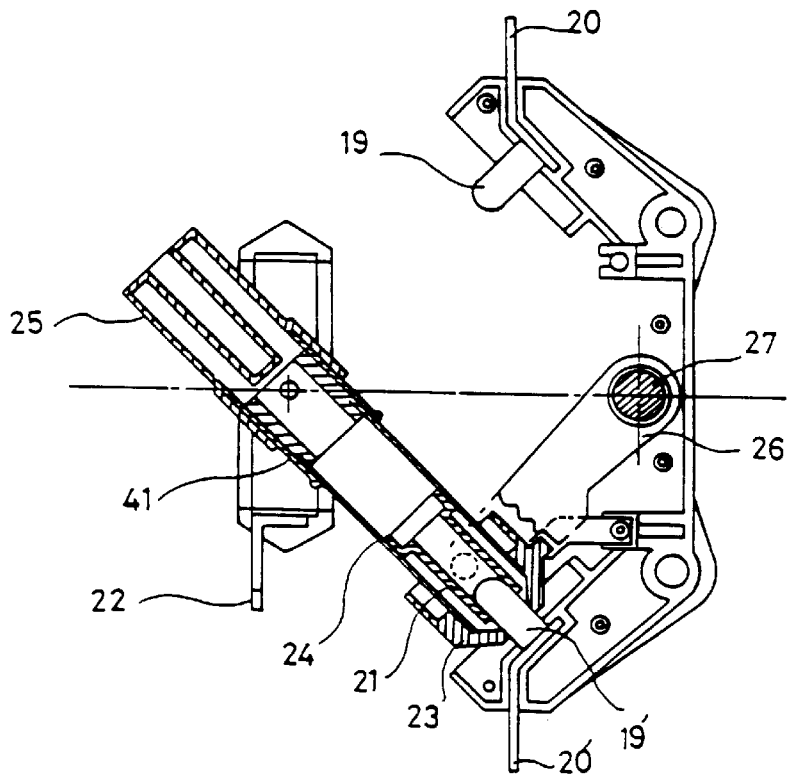
FIG. 17C is a partial cross-sectional diagram of a gas insulation type load break system of the present invention in which power is connected to ground.

So as to switch from the opened state to the earthed state, when the main shaft 27 is rotated by operating the operation handles 15, the movable arm 26 is rotated in the counterclockwise direction at about 45°, and then the insulation cap 23 rotates in the clockwise direction. As shown in FIG. 17C, the metallic piston 24 and the movement contact point 21 outwardly move from the sliding contact point 41 of the cylinder 25. At the same time, the earthing fixed contact point 19' is inserted into the hollow portion 23b of the insulation cap 23 and then is connected to the movement contact point 21, so that the charged current of the cable is discharged, thereby earthing the remaining current of the cable.

As shown in FIGS. 12 and 13, the earthing fixed contact point 19' is connected to the earthing bush bar 38, so that an earthing path is formed through the earthing bushing 17.

The switching to the closed state from the earthing state is performed by operating the operating handles 15 in the opposed order of the above-described operation. That is, the movement contact point 21 is escaped from the earthing fixed contact point 19', and then is connected to the current supplying fixed contact point 19.

Figure 6A:
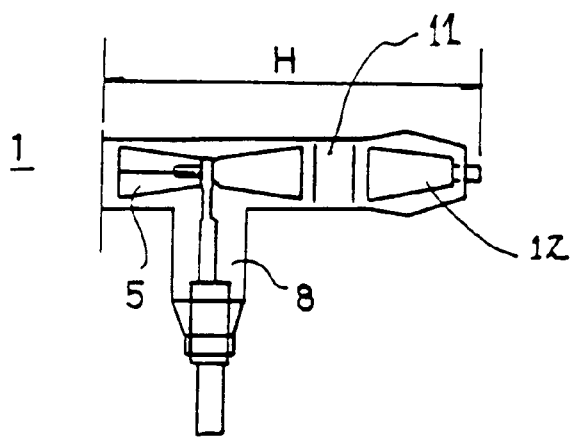
FIG. 6A is a diagram of an engaged state of a connector kit of a conventional load break system.
Figure 6B:
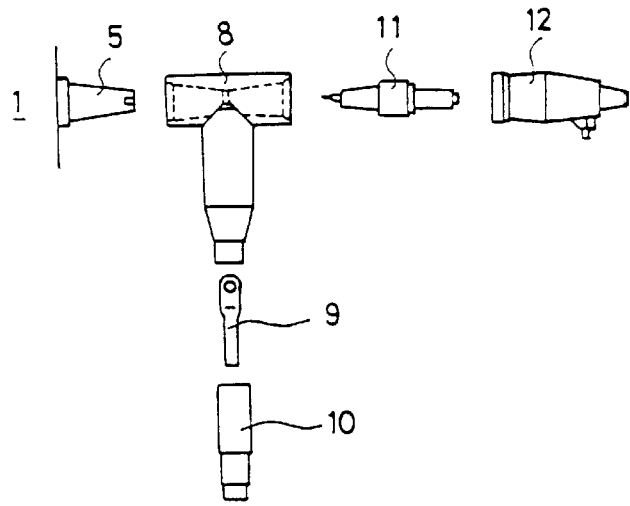
FIG. 6B is a diagram of a disassembled state of a connector kit of a conventional load break system.
Figure 7A:
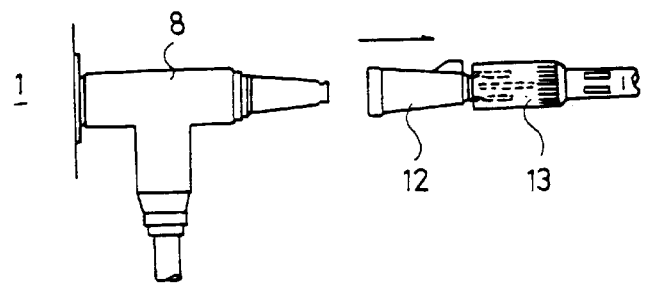
FIG. 7A is a diagram of a connector kit of a conventional load break system in which an insulation cap is removed so as to show a discharging operation of the same.
Figure 7B:
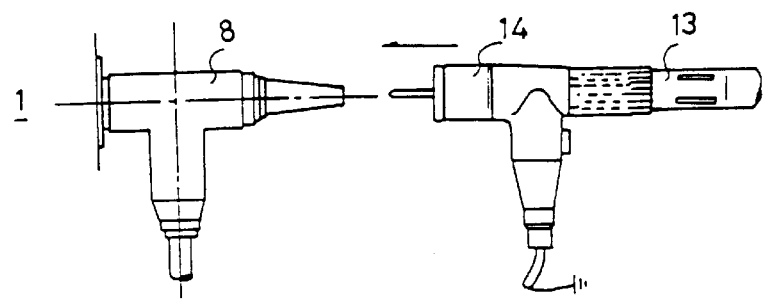
FIG. 7B is a diagram of a connector kit of a conventional load break system in which an earthing elbow is inserted so as to show a discharging operation of the same.
Figure 18A:
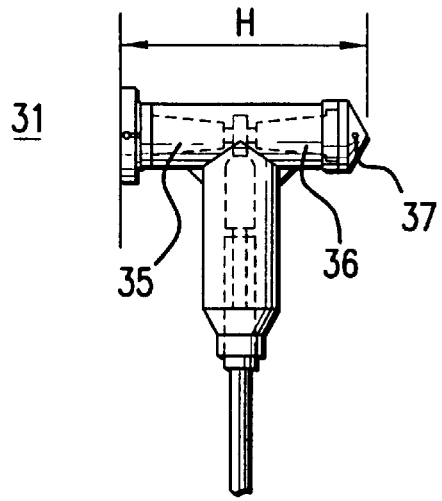
FIG. 18A is a diagram of a connector kit so as to show an engaged state of the same of the present invention.
Figure 18B:
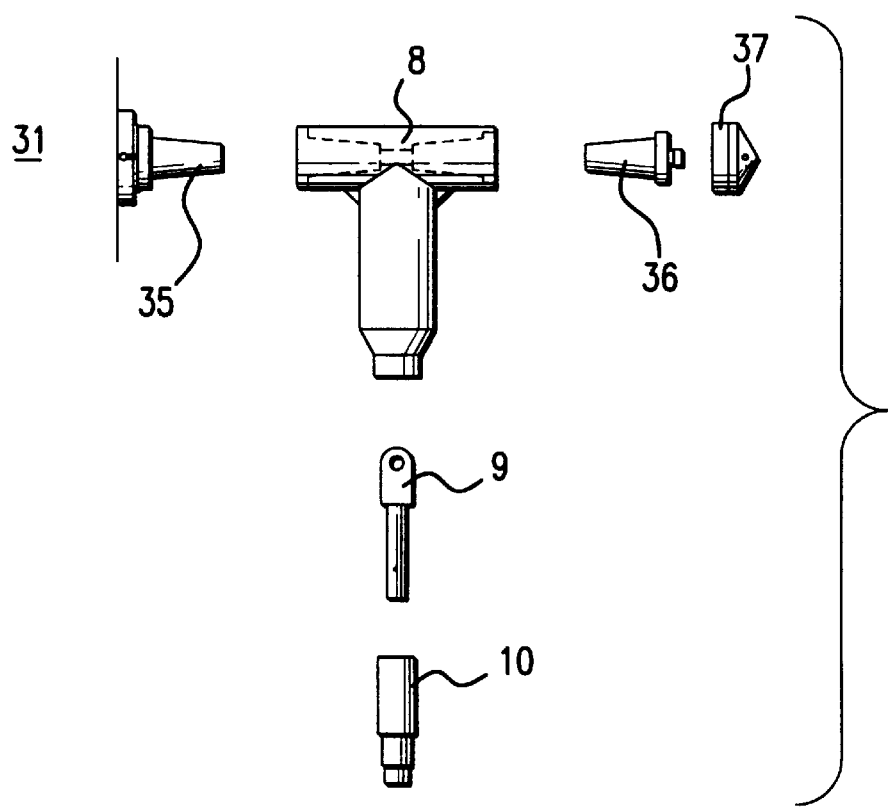
FIG. 18B is a diagram of a connector kit so as to show a disassembled state of the same of the present invention.

Meanwhile, the connection member terminal kit 16 of the present invention, as shown in FIGS. 18A and 18B, the insulation plug 36 and the insulation cap 37 are orderly engaged to the elbow connector 8 to which the main circuit bushings 35 are inserted. That is, the connection member terminal kit 16 of the present invention has a smaller size than the conventional art shown in FIG. 6A by reducing the size which is outwardly protruded. The length H' is shorter than the length H of the prior art.

With the above-mentioned construction, when testing the cable connection or the underground cable connection, in a state the mold cone or the earthing wire 28 is disconnected from the ground lug 18, a test voltage is applied to the terminal of the earthing bushing 17, so that the cable connection test can be performed through the earthing bushing. As compared to the conventional art, arc discharging work is not necessary in the present invention.

As described above, the gas insulation type load break system is directed to performing earthing and current discharging operation without generating arc in the air in easier manner as compared to the conventional art, so that is a more safety cable connection test can be performed thereby.

Although the preferred embodiments of the present invention have been disclosed for illustrative purposes, those skilled in the art will appreciate that various modifications, additions and substitutions are possible, without departing from the scope and spirit of the invention as described in the accompanying claims.

What is claimed is:

1. A gas insulation type load break system, comprising:
   a switch main body;
   an operation handle mounted on a front panel of the switch main body;
   a main circuit bushing mounted on the switch main body;
   an earthing bushing mounted on the switch main body; and
   a switching device that has three switching states including:
      a connected state where the main circuit bushing is connected to a current supply terminal,
      a grounded state where the main circuit bushing is connected to the earthing bushing, and
      a disconnected state where the main circuit bushing is not connected to the current supply terminal or the earthing bushing;
      wherein the switching device includes a predetermined shaped conductive member connected to a body rotatably disposed within the predetermined shaped conductive member, and a piston, having a movement contact point, disposed within the body.

2. The system of claim 1, wherein the body is a cylinder rotatably disposed within the predetermined shaped conductive member, and the piston is a metallic piston having an insulation cap disposed at an upper portion of the metallic piston.

3. The system of claim 2, wherein the switching device includes a movable arm rotatably engaged with protrusions, formed at opposite sides of the insulation cap, that are inserted into grooves formed within the movable arm.

4. The system of claim 2, wherein said cylinder includes a sliding contact point electrically connected to the predetermined shaped conductive member and formed within the interior of the cylinder, and said metallic piston is movable along the sliding contact point.

5. The system of claim 4, wherein said sliding contact point includes:
   a plurality of slits formed at a portion where the metallic piston contacts the sliding contact point,
   a protrusion formed at an upper portion of the slits, and
   a spring disposed below the protrusion.

6. The system of claim 4, wherein said movement contact point includes a plurality of slits longitudinally formed at the outer circumferential surface thereof, and a plurality of springs.

7. The system of claim 4, wherein an inner circumferential surface of said metallic piston is threadedly engaged with an outer circumferential portion of the movement contact point.

8. The system of claim 4, wherein said predetermined shaped conductive member includes a protrusion formed at an inner circumferential surface, and a copper spring disposed at the protrusion for electrically connecting the predetermined shaped conductive member and the sliding contact point.

9. The system of claim 2, wherein the predetermined shaped conductive member is electrically connected to the main circuit bushing.

10. The system of claim 9, wherein the movement contact point moves between three positional states based on operation of the operation handle, and
    wherein the three positional states include:
       the connected state where the movement contact point is electrically connected to the current supply terminal;
       the grounding state where the movement contact point is electrically connected to the earthing bushing; and
       the disconnected state where the movement contact point is not electrically connected to the current supply terminal or the earthing bushing.

11. A gas insulation type load break system, comprising:
    a switch main body, said switch main body being made of a single container;
    an operation handle mounted on a front panel of the switch main body for controlling an opening/closing state and earthing state of a current;
    a main circuit bushing mounted on a front panel of the switch main body for forming an opening/closing path of a current;
    an earthing bushing mounted on the switch body for forming an earthing path;
    a current supply fixed contact point that supplies a current to the interior of the switch main body;
    an earthing fixed contact point connected to the earthing bushing for discharging a current applied to the interior of the switch main body;
    a main shaft rotatable in cooperation with the operation handle;
    a movable arm engaged to the main shaft that moves in response to the rotation of the main shaft; and
    a switching device, operably mounted to the movable arm and selectively connected to one of the current supply fixed contact point and the earthing fixed contact point in cooperation with the movement of the movable arm, for selectively one of allowing a current to flow between the current supply fixed contact point and the main circuit bushing, allowing a current to flow between the main circuit bushing and the earthing bushing, and preventing current flow from the main circuit bushing and the current supply fixed contact point;

wherein said switching device includes a predetermined shaped conductive member connected to a cylinder rotatably connected to the predetermined shaped conductive member, a metallic piston, having a movement contact point, disposed within the cylinder, and an insulation cap disposed at an upper portion of the metallic piston.

12. The system of claim 11, wherein said switching device is engaged to the movable arm in cooperation with protrusions, formed at opposite sides of the insulation cap, that are inserted into grooves formed within the movable arm.

13. The system of claim 11, wherein said cylinder includes a sliding contact point electrically connected to the predetermined shaped conductive member and formed within the interior of the cylinder, and wherein said metallic piston is movable along the sliding contact point.

14. The system of claim 13, wherein said sliding contact point includes:
   a plurality of slits formed at a portion where the metallic piston contacts the sliding contact point,
   a protrusion formed at an upper portion of the slits, and
   a spring disposed below the protrusion.

15. The system of claim 13, wherein said movement contact point includes a plurality of slits longitudinally formed at the outer circumferential surface thereof, and a plurality of springs.

16. The system of claim 13, wherein an inner circumferential surface of said metallic piston is threadedly engaged with an outer circumferential portion of the movement contact point.

17. The system of claim 13, wherein said predetermined shaped conductive member includes a protrusion formed at an inner circumferential surface, and a copper spring disposed at the protrusion for electrically connecting the predetermined shaped conductive member and the sliding contact point.

18. The system of claim 11, wherein the predetermined shaped conductive member is electrically connected to the main circuit bushing.

19. The system of claim 18, wherein the movement contact point moves between three positional states based on operation of the operation handle, and
   wherein the three positional states include:
      a connected state where the movement contact point is electrically connected to the current supply fixed contact point;
      a grounding state where the movement contact point is electrically connected to the earthing bushing; and
      a disconnected state where the movement contact point is not electrically connected to the current supply fixed contact point or the earthing bushing.

* * * * *